(12) United States Patent
Watanabe et al.

(10) Patent No.: US 7,709,987 B2
(45) Date of Patent: May 4, 2010

(54) MAGNETO ROTOR

(75) Inventors: Toshiyuki Watanabe, Asaka (JP); Reiji Sato, Numazu (JP)

(73) Assignees: Honda Motor Co., Ltd., Tokyo (JP); Kokusan Denki Co., Ltd., Shizuoka-Ken (JP)

( * ) Notice: Subject to any disclaimer, the term of this patent is extended or adjusted under 35 U.S.C. 154(b) by 312 days.

(21) Appl. No.: 11/875,210

(22) Filed: Oct. 19, 2007

(65) Prior Publication Data
US 2008/0272663 A1 Nov. 6, 2008

(30) Foreign Application Priority Data
Oct. 20, 2006 (JP) .............................. 2006-285867

(51) Int. Cl.
*H02K 21/22* (2006.01)
*H02K 1/27* (2006.01)

(52) U.S. Cl. ............. 310/156.21; 310/153; 310/156.12; 310/156.28

(58) Field of Classification Search ................. 310/153, 310/156.12, 156.21, 156.26, 156.28
See application file for complete search history.

(56) References Cited

U.S. PATENT DOCUMENTS

| | | | | |
|---|---|---|---|---|
| 4,219,752 A | * | 8/1980 | Katou | 310/156.19 |
| 4,701,654 A | * | 10/1987 | Tatukawa et al. | 310/153 |
| 4,795,924 A | * | 1/1989 | Kamiyama et al. | 310/67 R |
| 5,744,881 A | * | 4/1998 | Ishizuka et al. | 310/67 R |
| 6,339,271 B1 | * | 1/2002 | Noble et al. | 310/74 |
| 6,414,777 B1 | * | 7/2002 | Miyamoto | 359/198.1 |
| 2007/0096575 A1 | * | 5/2007 | Sato | 310/156.28 |
| 2008/0191573 A1 | * | 8/2008 | Kihara et al. | 310/153 |

FOREIGN PATENT DOCUMENTS

| | | | | |
|---|---|---|---|---|
| JP | 52-073314 A | * | 6/1977 | |
| JP | 6-2954 | | 1/1994 | |
| JP | 10-145996 A | * | 5/1998 | |
| JP | 2000-324779 A | * | 11/2000 | |

* cited by examiner

*Primary Examiner*—Burton Mullins
(74) *Attorney, Agent, or Firm*—Pearne & Gordon LLP

(57) ABSTRACT

A magneto rotor which has a cup-like rotor yoke, a plurality of magnets secured on an inner periphery of a peripheral wall portion of the rotor yoke, and a magnet protecting cover having a cylindrical portion that covers inner peripheries of the magnets, and an outer flange being integrated with one axial end of the cylindrical portion and covering end surfaces of the magnets, wherein an annular protrusion protruding toward the opening of the rotor yoke is formed on an area closer to an inner periphery of the outer flange of the magnet protecting cover, an annular adhesive storage portion is formed between the peripheral wall portion closer to the open end of the rotor yoke and the annular protrusion, a groove opening into the adhesive storage portion and continuing circumferentially of the rotor yoke is also formed in the peripheral wall portion closer to the open end of the rotor yoke, and the adhesive storage portion and the groove are filled with an adhesive to seal a boundary between the outer flange of the magnet protecting cover and the peripheral wall portion of the rotor yoke with the adhesive.

4 Claims, 3 Drawing Sheets

MAGNETO ROTOR

TECHNICAL FIELD OF THE INVENTION

The present invention relates to a magneto rotor suitable for use as a rotor of a magneto generator mounted to an engine.

PRIOR ART OF THE INVENTION

A rotor of a magneto generator mounted to an engine includes a cup-like rotor yoke having a peripheral wall portion and a bottom wall portion formed at one axial end of the peripheral wall portion, the other axial end of the peripheral wall portion being an open end, and a plurality of permanent magnets arranged circumferentially of the peripheral wall portion of the rotor yoke and secured to an inner periphery of the peripheral wall portion as disclosed in Japanese Utility Model Application Laid-Open Publication No. 6-2954. A boss is provided at the center of the bottom wall portion of the rotor yoke, and mounted to a rotating shaft of the engine.

In use of a relatively weak magnet such as a rare-earth magnet as a permanent magnet in a magneto rotor, a protecting cover that covers the permanent magnet is provided for preventing breakage of the permanent magnet in assembly of a generator. The magnet protecting cover is made of sheet metal such as stainless steel, and includes a cylindrical portion that covers inner peripheries of a plurality of permanent magnets secured to a peripheral wall portion of a rotor yoke, and an outer flange integrally formed with one axial end of the cylindrical portion. The magnet protecting cover is placed so that the cylindrical portion is positioned on the inner peripheries of the plurality of permanent magnets and the outer flange is abutted against outer end surfaces of the permanent magnets at an open end of the rotary yoke.

On the inside of the magneto rotor mounted to a rotating shaft of an engine, a stator including an armature core and an armature coil wound around the armature core is placed, and a magneto generator is comprised of the stator and the magneto rotor.

In the magneto generator mounted to the engine, in some cases, the magneto rotor and the stator are placed in a case and engine oil is applied to the armature coil for cooling the armature coil. In this case, if the magneto rotor is used to which the magnet protecting cover is mounted for protecting the permanent magnet, the oil may enter inside the magnet protecting cover to be stored inside the protecting cover and turn to tar in due course, causing deviation in weight balance of the magneto rotor.

In a magneto rotor mounted to an engine such as an outboard motor used on the sea, if salt water enters inside a magnet protecting cover, a magnet may be degraded or salt precipitated inside the magnet protecting cover may be solidified, causing deviation in weight balance of the rotor.

Thus, in the magneto rotor disclosed in Japanese Utility Model Application Laid-Open Publication No. 6-2954, a boundary between an outer flange of a magnet protecting cover and the peripheral wall portion of the rotor yoke is sealed by an adhesive and curling. In the magneto rotor disclosed in Japanese Utility Model Application Laid-Open Publication No. 6-2954, a thin portion is formed in an area closer to the open end in the peripheral wall portion of the rotor yoke, and a step is formed between the thin portion and the other portion in the peripheral wall portion of the rotor yoke. A circumferentially provided groove is provided in the step, and an annular insertion portion formed on an outer periphery of the outer flange of the magnet protecting cover is inserted into the circumferentially provided groove. After the circumferentially provided groove is filled with the adhesive, the thin portion in the peripheral wall portion of the rotor yoke is curled toward the magnet protecting cover to secure the outer flange of the magnet protecting cover to the magnet, and the curled portion covers the circumferentially provided groove filled with the adhesive.

In the magneto rotor disclosed in Japanese Utility Model Application Laid-Open Publication No. 6-2954, it is difficult to fill, with the adhesive, the circumferentially provided groove into which the outer peripheral portion of the outer flange of the magnet protecting cover is inserted after curling the thin portion in the peripheral wall portion of the rotor yoke. Thus, the circumferentially provided groove is filled with the adhesive before curling the thin portion in the peripheral wall portion of the rotor yoke. If the circumferentially provided groove is filled with the adhesive before curling, stress applied to the adhesive in curling may cause a crack in the adhesive or cause the adhesive to come off the inner surface of the circumferentially provided groove, reducing a sealing effect of the adhesive. Since the seal cannot be achieved only by the curled portion, the reduced sealing effect of the adhesive cannot prevent oil or salt water from entering inside the magnet protecting cover.

In the magneto rotor disclosed in Japanese Utility Model Application Laid-Open Publication No. 6-2954, the thin portion in the peripheral wall portion of the rotor yoke needs to be curled, which increases the number of production man-hours and inevitably increases production costs.

SUMMARY OF THE INVENTION

The present invention has an object to provide a magneto rotor that can reliably seal a boundary between an outer flange of a magnet protecting cover and a peripheral wall portion of a rotor yoke without troublesome curling.

The present invention is applied to a magneto rotor including: a cup-like rotor yoke having a peripheral wall portion and a bottom wall portion formed at one axial end of the peripheral wall portion, the other axial end of the peripheral wall portion being an open end; a plurality of permanent magnets arranged circumferentially of the rotor yoke and secured to an inner periphery of the peripheral wall portion of the rotor yoke; and a magnet protecting cover having a cylindrical portion that covers inner peripheries of the plurality of permanent magnets, and an outer flange integrally formed at with one axial end of the cylindrical portion, and is placed so that the cylindrical portion is positioned inside the plurality of permanent magnets and the outer flange covers outer end surfaces of the permanent magnets at the open end of the rotor yoke.

In the present invention, an annular protrusion protruding toward the opening of the rotor yoke is formed on an area closer to an inner periphery of the outer flange of the magnet protecting cover, and an annular adhesive storage portion continuing circumferentially of the rotor yoke is formed between the peripheral wall portion closer to the open end of the rotor yoke and the annular protrusion. A groove opening into the adhesive storage portion and continuing circumferentially of the rotor yoke is formed in the peripheral wall portion closer to the open end of the rotor yoke, the adhesive storage portion and the groove are filled with an adhesive to seal a boundary between the outer flange of the magnet protecting cover and the peripheral wall portion of the rotor yoke.

The other axial end of the cylindrical portion of the magnet protecting cover may be sealed by sealing means conventionally used such as abutting the other axial end against the bottom wall portion of the rotor yoke and bonding the end thereto.

Comprised as described above, the adhesive storage portion is filled with the adhesive and the groove provided in the peripheral wall portion of the rotor yoke is also filled with the adhesive, thereby increasing a creepage distance of a liquid entering path formed between an adhesive layer and an inner surface of the peripheral wall portion of the rotor yoke. Thus, even if the adhesive comes off partly at an interface between the adhesive layer and the inner surface of the peripheral wall portion of the rotor yoke, a gap does not extend over the entire liquid entering path to break a seal, thereby ensuring the seal at the boundary between the outer flange of the magnet protecting cover and the peripheral wall portion of the rotor yoke.

Comprised as descried above, part of the adhesive layer wedges into the groove continuing circumferentially of the rotor yoke, thereby preventing the adhesive layer from coming off the outer flange of the magnet protecting cover. Thus, the magnet protecting cover can be reliably secured without curling the open end of the peripheral wall portion of the rotor yoke.

In a preferred aspect of the present invention, an inner diameter of the peripheral wall portion near the open end of the rotor yoke is enlarged, and an annular abutting surface continuing circumferentially of the rotor yoke is formed on a step formed between a portion with the enlarged inner diameter of the peripheral wall portion and the other portion. In this case, the outer flange of the magnet protecting cover is provided so as to extend beyond the outer end surfaces of the plurality of permanent magnets and reach the abutting surface. An area closer to the cylindrical portion of the outer flange is curved to protrude toward the opening of the rotor yoke, and thus an annular protrusion protruding toward the opening of the rotor yoke and continuing circumferentially of the rotor yoke is formed on the area closer to the cylindrical portion of the outer flange, and an adhesive storage portion continuing circumferentially of the rotor yoke is formed between the portion with the enlarged inner diameter of the peripheral wall portion of the rotor yoke and the annular protrusion of the outer flange of the magnet protecting cover. Also, a groove opening into the adhesive storage portion near the abutting surface and continuing circumferentially of the rotor yoke is formed in the peripheral wall portion closer to the open end of the rotor yoke, the adhesive storage portion and the groove are filled with the adhesive to seal a boundary between the outer flange of the magnet protecting cover and the peripheral wall portion of the rotor yoke with the adhesive.

The groove is preferably provided so that a deepest portion of the groove is positioned closer to the bottom wall portion of the rotor yoke than the abutting surface in the peripheral wall portion of the rotor yoke.

The groove is thus provided so that the deepest portion of the groove is positioned closer to the bottom wall portion of the rotor yoke than the abutting surface formed on the step in the peripheral wall portion of the rotor yoke, which further increases the creepage distance of the liquid entering path formed between the adhesive layer and the inner surface of the peripheral wall portion of the rotor yoke as compared with the case where the deepest portion of the groove is positioned on an extension of the abutting surface, and thus increases a sealing effect.

In the case where the groove is provided so that the deepest portion of the groove is positioned closer to the bottom wall portion of the rotor yoke than the abutting surface formed on the step in the peripheral wall portion of the rotor yoke as described above, the groove is preferably provided to open in a direction inclined toward the open end of the rotor yoke with respect to a radial direction of the rotor yoke.

Comprised as described above, a cutting tool can be inserted slantingly from the open end of the rotor yoke to cut the peripheral wall portion closer to the open end of the rotor yoke, and thus the groove having the deepest portion positioned closer to the bottom wall portion of the rotor yoke than the abutting surface can be easily formed.

The outer flange of the magnet protecting cover is preferably provided so that an outer peripheral portion of the outer flange is placed in the groove.

In the case where the deepest portion of the groove is positioned closer to the bottom wall portion of the rotor yoke than the abutting surface, and the groove is provided so as to open in the direction inclined toward the open end of the rotor yoke with respect to the radial direction of the rotor yoke, the outer peripheral portion of the outer flange of the magnet protecting cover is placed in the groove to bring the adhesive in the groove into contact with both surfaces of an area closer to the outer periphery of the outer flange of the magnet protecting cover and hold the outer flange, thereby allowing the outer flange of the magnet protecting cover to be reliably held by the adhesive in the groove, and increasing securing strength of the outer flange of the magnet protecting cover.

BRIEF DESCRIPTION OF THE DRAWINGS

The above and other objects and features of the invention will be apparent from the detailed description of the preferred embodiments of the invention, which is described and illustrated with reference to the accompanying drawings, in which.

DETAILED DESCRIPTION OF THE PREFERRED EMBODIMENTS

Figure 1:
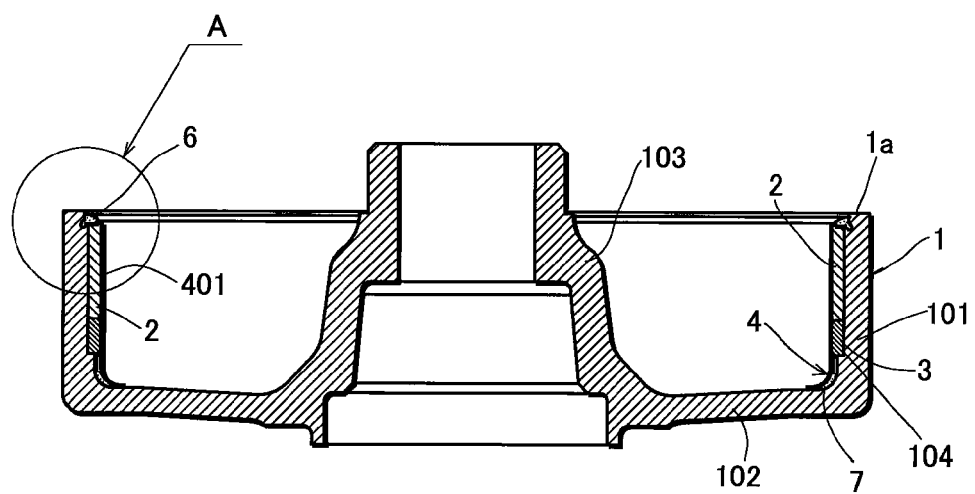
FIG. 1 is a vertical sectional view of a magneto rotor according to an embodiment of the present invention.

Now, preferred embodiments of the present invention will be described with reference to the drawings.

In FIGS. 1 to 4, a reference numeral 1 denotes a cup-like rotor yoke. The rotor yoke 1 has a peripheral wall portion 101 integrally formed with a bottom wall portion 102 formed at one axial end of the peripheral wall portion, the other axial end of the peripheral wall portion 101 being an open end 1a. A boss 103 protruding inward of the rotor yoke is formed at the center of the bottom wall portion 102 of the rotor yoke 1, and mounted to an unshown rotating shaft of an engine.

An inner diameter of the peripheral wall portion 101 is enlarged near the open end of the rotor yoke 1, and a step 105 is formed between the portion 101a with the enlarged inner diameter of the peripheral wall portion and the other portion. The step 105 has an annular abutting surface 105a perpendicular to an axis of the rotor yoke and continuously extending circumferentially of the rotor yoke. Against the abutting surface, an outer flange of a magnet protecting cover described later is abutted.

Reference numerals 2, 2, . . . denote a plurality of arcuate permanent magnets. The permanent magnets are rare-earth magnets, and arranged circumferentially of the rotor yoke 1 and secured to an inner periphery of the peripheral wall portion 101. The series of permanent magnets 2, 2, . . . are placed so that outer end surfaces (axial end surfaces directed to the opening of the rotor yoke) 2a, 2a, . . . thereof (see FIG. 2) are flush with the abutting surface 105a. Inner end surfaces (axial end surfaces directed to the bottom wall portion 102 of the rotor yoke) of the permanent magnets 2, 2, . . . are abutted via a spacer 3 against a step 104 formed on the inner periphery of the peripheral wall portion closer to the bottom wall portion 102 of the rotor yoke, and thus each permanent magnet 2 is positioned axially of the rotor yoke 1. The spacer 3 is formed of a ring-shaped member of non-magnetic material (material other than ferromagnetic material) such as aluminum, and has a thickness smaller than the permanent magnet 2. The permanent magnets 2, 2, . . . and the spacer 3 are secured to the inner periphery of the peripheral wall portion 101 by an adhesive.

A plurality of magnetized areas arranged circumferentially of the rotor yoke are set on the permanent magnets 2, 2, . . . secured to the inner periphery of the peripheral wall portion of the rotor yoke 1, the magnetized areas are magnetized radially of the rotor yoke with alternately different magnetizing directions to produce a magnetic field having a predetermined number of poles with alternately different magnetic poles being arranged circumferentially of the rotor yoke.

Figure 2:
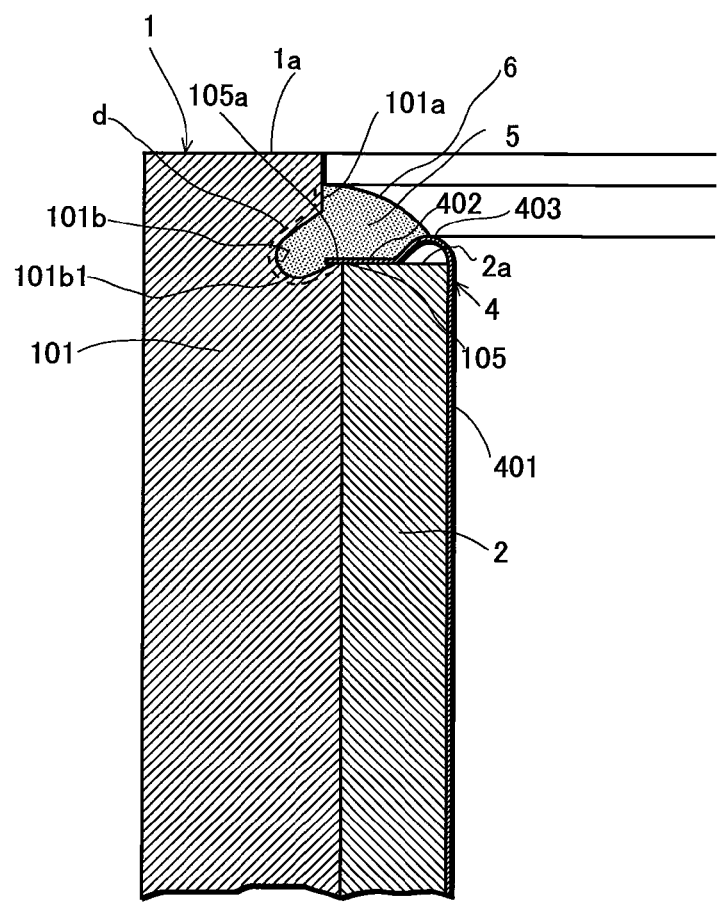
FIG. 2 is an enlarged sectional view of a part A in FIG. 1.

In order to protect the permanent magnets 2, 2, . . . , a magnet protecting cover 4 is provided formed of press formed sheet metal such as stainless steel. As shown in FIG. 2, the magnet protecting cover 4 has a cylindrical portion 401 that covers inner peripheries of the permanent magnets 2, 2, . . . , and an outer flange 402 integrally formed with one axial end of the cylindrical portion. The magnet protecting cover 4 is placed so that the cylindrical portion 401 is positioned inside the permanent magnets 2, 2, . . . along inner peripheral surfaces of the permanent magnets 2, 2, . . . , and the outer flange 402 is abutted against the outer end surfaces 2a, 2a, . . . of the permanent magnets 2, 2, . . . at the open end 1a of the rotor yoke 1.

In the embodiment, an area closer to the cylindrical portion 401 of the outer flange 402 of the magnet protecting cover is curved to protrude toward the opening of the rotor yoke 1, and thus an annular protrusion 403 protruding toward the opening of the rotor yoke 1 and continuing circumferentially of the rotor yoke 1 is formed on the area closer to the cylindrical portion of the outer flange 402, and an adhesive storage portion 5 continuing circumferentially of the rotor yoke 1 is formed between the portion 101a with the enlarged inner diameter in the peripheral wall portion 101 of the rotor yoke 1 and the annular protrusion 403 of the outer flange 402 of the magnet protecting cover 4.

Figure 4:
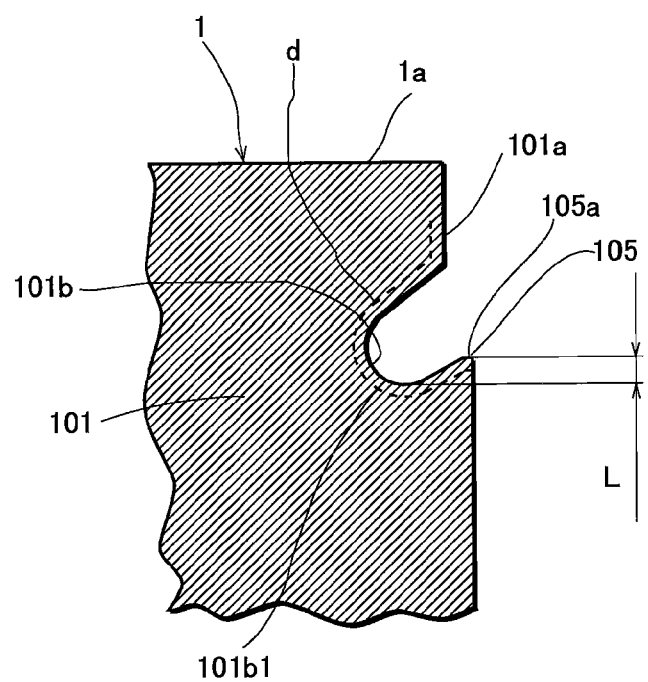
FIG. 4 is a sectional view of an area closer to an open end of a peripheral wall portion of a rotor yoke used in the embodiment.

Further, a groove 101b opening into the adhesive storage portion 5 near the abutting surface 105a and continuing circumferentially of the rotor yoke 1 is formed in the peripheral wall portion 101 closer to the open end of the rotor yoke 1. In the embodiment, the groove 101b is provided slantingly to an axis of the rotor yoke so as to open in a direction inclined toward the open end of the rotor yoke 1 with respect to the radial direction of the rotor yoke 1. As shown in FIG. 4, the groove 101b is provided so that a deepest portion 101b1 of the groove 101b is positioned closer to the bottom wall portion 102 of the rotor yoke by a distance L than the abutting surface 105a in the peripheral wall portion 101 of the rotor yoke.

The outer flange 402 of the magnet protecting cover 4 is provided so as to extend beyond the outer end surfaces 2a of the plurality of permanent magnets 2, 2, . . . , reach the abutting surface 105a provided on the rotor yoke, and further extend toward the groove 101b, and an outer peripheral portion of the outer flange 402 of the magnet protecting cover is inserted into the groove 101b. Then, the adhesive storage portion 5 and the groove 101b are filled with the adhesive 6, and a boundary between the outer flange 402 of the magnet protecting cover and the peripheral wall portion 101 of the rotor yoke is sealed by the adhesive 6.

The other axial end of the cylindrical portion 401 of the magnet protecting cover 4 is formed to be placed in abutment against the inner surface closer to the outer peripheral portion of the bottom wall portion 102 of the rotor yoke 1. An adhesive 7 is applied continuously circumferentially of the rotor yoke between the outer peripheral surface of the other axial end of the cylindrical portion 401 and the area closer to the peripheral wall portion 101 of the bottom wall portion 102. The adhesive 7 bonds the other end of the cylindrical portion 401 of the magnet protecting cover 4 to the inner surface of the bottom wall portion of the rotor yoke over the entire circumference to seal the abutting portion between the other end of the magnet protecting cover 4 and the bottom wall portion 102 of the rotor yoke.

Figure 6:
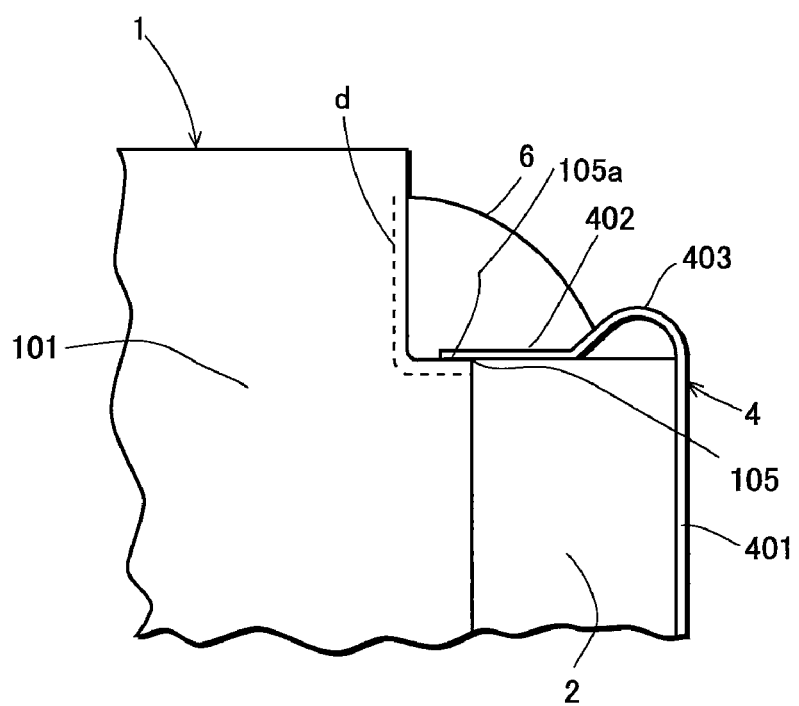
FIG. 6 is a sectional view of essential portions formed when no groove is provided in the peripheral wall portion of the rotor yoke in the embodiment of the present invention.

As in the embodiment, with the structure in which the annular protrusion 403 protruding toward the opening of the rotor yoke 1 is formed in the area closer to the inner periphery of the outer flange 402 of the magnet protecting cover 4, the annular adhesive storage portion 5 continuing circumferentially of the rotor yoke is formed between the peripheral wall portion 101a closer to the open end of the rotor yoke and the annular protrusion 403, the groove 101b opening into the adhesive storage portion 5 and continuing circumferentially of the rotor yoke 1 is further formed in the peripheral wall portion 101 closer to the open end 1a of the rotor yoke 1, the adhesive storage portion 5 is filled with the adhesive 6 and the groove 101b in the peripheral wall portion 101 of the rotor yoke is also filled with the adhesive 6, thereby sealing the connecting portion between the outer flange 402 of the magnet protecting cover 4 and the peripheral wall portion 101 of the rotor yoke 1, a creepage distance d (see FIGS. 2 and 3) of a liquid entering path formed between an adhesive layer and the inner surface of the peripheral wall portion 101 of the rotor yoke 1 can be increased as compared with the case where no groove 101b is formed as shown in FIG. 6. This allows the boundary between the outer flange 402 of the magnet protecting cover 4 and the peripheral wall portion of the rotor yoke 1 to be reliably sealed.

Comprised as described above, part of the adhesive layer wedges into the groove 101b continuing circumferentially of the rotor yoke 1, thereby preventing the adhesive layer from coming off the outer flange 402 of the magnet protecting cover. Thus, the magnet protecting cover 4 can be reliably secured without curling the open end of the peripheral wall portion 101 of the rotor yoke.

Further, as in the embodiment, in the case where the groove 101b is provided so that the deepest portion 101b1 of the groove 101b is positioned closer to the bottom wall portion of the rotor yoke by the distance L than the abutting surface 105a in the peripheral wall portion 101 of the rotor yoke (see FIG. 4), the creepage distance d of the liquid entering path formed between the adhesive layer and the inner surface of the peripheral wall portion of the rotor yoke can be increased to increase a sealing effect.

Figure 3:
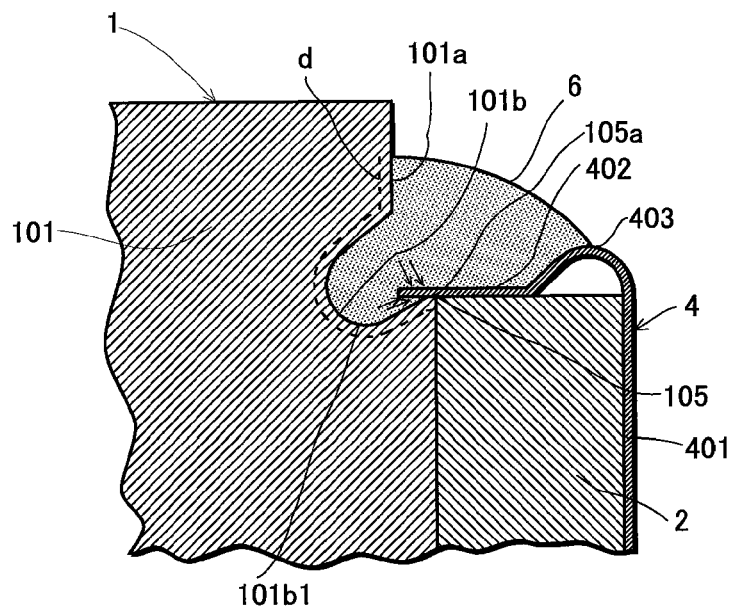
FIG. 3 is a further enlarged sectional view of essential portions in FIG. 2.

As in the embodiment, in the case where the deepest portion 101b1 of the groove 101b is positioned closer to the bottom wall portion 102 of the rotor yoke than the abutting surface 105a in the peripheral wall portion of the rotor yoke, the groove 101b is provided so as to open in the direction inclined toward the open end 1a of the rotor yoke with respect to the radial direction of the rotor yoke 1, and the outer peripheral portion of the outer flange 402 of the magnet protecting cover 4 is inserted into the groove 101b, as shown in FIG. 3, the adhesive 6 in the groove 101b can be brought into contact with both surfaces of an area closer to the outer periphery of the outer flange 402 of the magnet protecting cover so that the outer flange 402 is held by the adhesive layer, thereby allowing the outer flange 402 of the magnet protecting cover to be more reliably held by the adhesive 6 in the groove 101b, and increasing securing strength of the outer flange 402 of the magnet protecting cover.

Figure 5:
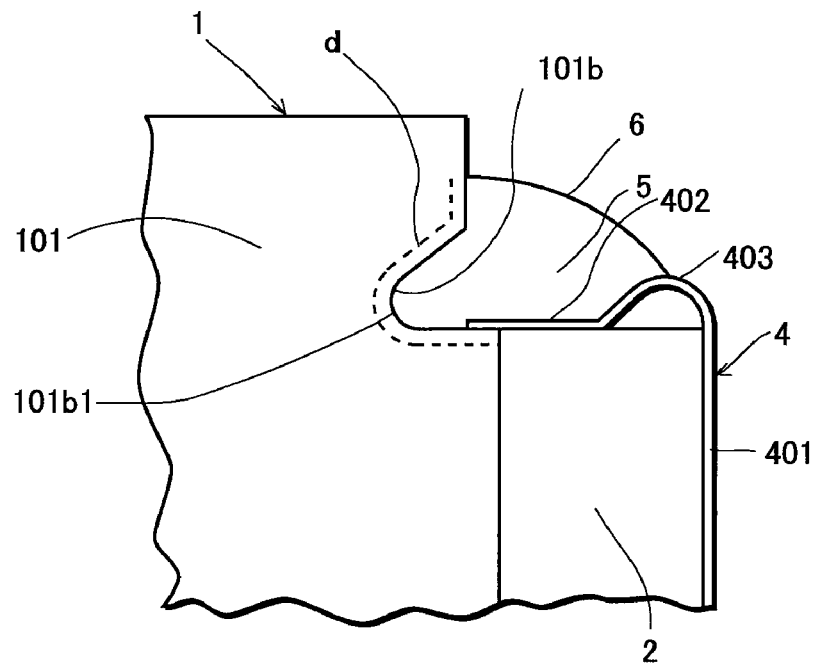
FIG. 5 is a vertical sectional view of essential portions of a magneto rotor according to another embodiment of the present invention.

As in the embodiment, in the case where the groove 101b is provided so that the deepest portion 101b1 of the groove 101b is positioned closer to the bottom wall portion 102 of the rotor yoke by the distance L than the abutting surface 105a, the creepage distance d of the liquid entering path formed between the adhesive layer and the inner surface of the peripheral wall portion of the rotor yoke can be particularly increased to increase the sealing effect. However, the present invention is not limited to the example of forming the groove 101b in this manner, but for example, as shown in FIG. 5, the groove 101b may be provided so that the deepest portion 101b1 of the groove 101b is positioned on an extension of the abutting surface 105a, or an area closer to the open end of the rotor yoke than the extension of the abutting surface 105a. Also in this case, the creepage distance d of the liquid entering path formed between the adhesive layer and the inner surface of the peripheral wall portion of the rotor yoke can be increased to increase the sealing effect as compared with the case where no groove 101b is provided.

In the embodiment, the outer end surface of each permanent magnet 2 is positioned in flush with the abutting surface 105a, and the outer flange 402 of the magnet protecting cover 4 is abutted against the outer end surface (the surface directed to the opening of the rotor yoke) of the permanent magnet 2. However, it is only necessary that the magnet protecting cover 4 is placed so that the outer flange 402 covers the outer end surface of the permanent magnet 2, and there is no need for the outer flange 402 to be abutted against the outer end surface of the permanent magnet 2. For example, it is allowed that each permanent magnet 2 is mounted so that the outer end surface of each permanent magnet 2 is placed in a position retracted closer to the bottom wall portion of the rotor yoke than the abutting surface 105a so that a gap is formed between the outer end surface of each permanent magnet 2 and the outer flange 402 of the magnet protecting cover.

Although the preferred embodiments of the invention have been described and illustrated with reference to the accompanying drawings, it will be understood by those skilled in the art that those are by way of examples, and that various changes and modifications may be made without departing from the spirit and scope of the invention, which is defined only to the appended claims.

What is claimed is:
1. A magneto rotor comprising:
   a cup-like rotor yoke having a peripheral wall portion and a bottom wall portion formed at one axial end of said peripheral wall portion, the other axial end of said peripheral wall portion being an open end;
   a plurality of permanent magnets arranged circumferentially of said rotor yoke and secured to an inner periphery of said peripheral wall portion; and
   a magnet protecting cover that has a cylindrical portion covering inner peripheries of said plurality of permanent magnets and an outer flange integrally formed with one axial end of said cylindrical portion, and is placed so that said cylindrical portion is positioned inside said plurality of permanent magnets and said outer flange covers outer end surfaces of said permanent magnets at the open end of said rotor yoke,
   wherein an inner diameter of the peripheral wall portion near the open end of said rotor yoke is enlarged, and an annular abutting surface continuing circumferentially of said rotor yoke is formed on a step formed between a portion with the enlarged inner diameter of said peripheral wall portion and an other portion,
   said outer flange of said magnet protecting cover is provided so as to extend beyond said outer end surfaces of said plurality of permanent magnets and reach said abutting surface, an area closer to said cylindrical portion of said outer flange is curved to protrude toward the opening of said rotor yoke, and thus an annular protrusion protruding toward the opening of said rotor yoke and continuing circumferentially of said rotor yoke is formed on the area closer to said cylindrical portion of said outer flange,
   an adhesive storage portion continuing circumferentially of said rotor yoke is formed between the portion with the enlarged inner diameter of the peripheral wall portion of said rotor yoke and said annular protrusion of the outer flange of said magnet protecting cover,
   a groove opening into said adhesive storage portion near said abutting surface and continuing circumferentially of said rotor yoke is formed in the peripheral wall portion closer to the open end of said rotor yoke, and said adhesive storage portion and said groove are filled with the adhesive to seal a boundary between the outer flange of said magnet protecting cover and the peripheral wall portion of said rotor yoke,
   wherein said groove is provided so that a deepest portion of the groove is positioned closer to the bottom wall portion of said rotor yoke than said abutting surface in the peripheral wall portion of said rotor yoke.

2. The magneto rotor according to claim 1 wherein the outer flange of said magnet protecting cover is placed so that an outer peripheral portion of the outer flange is inserted into said groove.

3. A magneto rotor comprising:
   a cup-like rotor yoke having a peripheral wall portion and a bottom wall portion formed at one axial end of said peripheral wall portion, the other axial end of said peripheral wall portion being an open end;
   a plurality of permanent magnets arranged circumferentially of said rotor yoke and secured to an inner periphery of said peripheral wall portion; and
   a magnet protecting cover that has a cylindrical portion covering inner peripheries of said plurality of permanent magnets and an outer flange integrally formed with one axial end of said cylindrical portion, and is placed so that said cylindrical portion is positioned inside said plurality of permanent magnets and said outer flange covers outer end surfaces of said permanent magnets at the open end of said rotor yoke,
   wherein an inner diameter of the peripheral wall portion near the open end of said rotor yoke is enlarged, and an annular abutting surface continuing circumferentially of said rotor yoke is formed on a step formed between a portion with the enlarged inner diameter of said peripheral wall portion and an other portion, said outer flange of said magnet protecting cover is provided so as to extend beyond said outer end surfaces of said plurality of permanent magnets and reach said abutting surface, an area closer to said cylindrical portion of said outer flange is curved to protrude toward the opening of said rotor yoke, and thus an annular protrusion protruding toward the opening of said rotor yoke and continuing circumferentially of said rotor yoke is formed on the area closer to said cylindrical portion of said outer flange, an adhesive storage portion continuing circumferentially of said rotor yoke is formed between the portion with the enlarged inner diameter of the peripheral wall portion of said rotor yoke and said annular protrusion of the outer flange of said magnet protecting cover, a groove opening into said adhesive storage portion near said abutting surface and continuing circumferentially of said rotor yoke is formed in the peripheral wall portion closer to the open end of said rotor yoke, and said adhesive storage portion and said groove are filled with the adhesive to seal a boundary between the outer flange of said magnet protecting cover and the peripheral wall portion of said rotor yoke, wherein said groove is provided so that a deepest portion of the groove is positioned closer to the bottom wall portion of said rotor yoke than said abutting surface in the peripheral wall portion of said rotor yoke, and wherein said groove opens in a direction inclined toward the open end of said rotor yoke with respect to a radial direction of said rotor yoke.

4. The magneto rotor according to claim 3, wherein the outer flange of said magnet protecting cover is placed so that an outer peripheral portion of the outer flange is inserted into said groove.

\* \* \* \* \*